US009098262B2

(12) United States Patent
Frailong et al.

(10) Patent No.: US 9,098,262 B2
(45) Date of Patent: *Aug. 4, 2015

(54) EFFICIENT ARITHIMETIC LOGIC UNITS

(71) Applicant: Juniper Networks, Inc., Sunnyvale, CA (US)

(72) Inventors: Jean-Marc Frailong, Los Altos Hills, CA (US); Pradeep S. Sindhu, Los Altos Hills, CA (US); Jeffrey G. Libby, Cupertino, CA (US); Jian Hui Huang, Fremont, CA (US); Rajesh Nair, Fremont, CA (US); John Keen, Mountain View, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/529,331

(22) Filed: Oct. 31, 2014

(65) Prior Publication Data

US 2015/0058599 A1  Feb. 26, 2015

Related U.S. Application Data

(63) Continuation of application No. 12/486,114, filed on Jun. 17, 2009, now Pat. No. 8,880,856.

(51) Int. Cl.
*G06F 9/28* (2006.01)
*G06F 15/00* (2006.01)
*G06F 9/30* (2006.01)

(52) U.S. Cl.
CPC .. *G06F 9/28* (2013.01); *G06F 9/30* (2013.01); *G06F 9/3001* (2013.01); *G06F 15/00* (2013.01)

(58) Field of Classification Search
None
See application file for complete search history.

(56) References Cited

U.S. PATENT DOCUMENTS

| 4,120,583 | A  | 10/1978 | Hyatt |
| 5,481,736 | A  | 1/1996  | Schwartz |
| 5,751,614 | A  | 5/1998  | Cohen |
| 6,223,277 | B1 | 4/2001  | Karguth |
| 8,880,856 | B1 | 11/2014 | Frailong et al. |
| 2002/0124155 | A1 | 9/2002 | Sami et al. |
| 2006/0288195 | A1 | 12/2006 | Ma et al. |
| 2009/0240920 | A1 | 9/2009 | Muff et al. |

OTHER PUBLICATIONS

Koh et al. "Functional Unit Chaining: A Runtime Adaptive Architecture for Reducing Bypass Delays", 2006.
"ARM1136JF-S and ARM1136J-S Technical Reference Manual", Revision: r1p1, 2005.

*Primary Examiner* — Corey S Faherty
(74) *Attorney, Agent, or Firm* — Harrity & Harrity, LLP

(57) ABSTRACT

A processor may include a conditional arithmetic logic unit and a main arithmetic logic unit. The conditional arithmetic logic unit may perform a first arithmetic logic operation to generate a first result, and output the result. The main arithmetic logic unit may select input buses among a plurality of data buses that carry the first result from the conditional arithmetic logic unit, perform a second arithmetic logic operation on data provided by the selected input buses to generate a second result, and write the second result in a storage component.

20 Claims, 12 Drawing Sheets 504-1

| LMA 602-0 || LMB 602-1 ||
|---|---|---|---|
| SA0 604-0 || SA1 604-1 ||
| REA 606-0 | REB 606-1 | ROA 608-0 | ROB 608-1 |
| KA 610-0 || KB 610-1 ||

| CA0 612-0 | CFE0 614-0 | CB0 616-0 | COP0 618-0 |
|---|---|---|---|
| CA1 612-1 | CFE1 614-1 | CB1 616-1 | COP1 618-1 |
| CA2 612-2 | CFE2 614-2 | CB2 616-2 | COP2 618-2 |
| CA3 612-3 | CFE3 614-3 | CB3 616-3 | COP3 618-3 |

CW 620

| MA0 622-0 | MFE0 624-0 | MB0 626-0 | MOP0 628-0 |
|---|---|---|---|
| MFI0 630-0 | MW0 632-0 | | |
| MA1 622-1 | MFE1 624-1 | MB1 626-1 | MOP1 628-1 |
| MFI1 630-1 | MW1 632-1 | | |

OTHER 634

| MOP | RESULT |
|---|---|
| 0000 | A & B |
| 0001 | A \| B |
| 0010 | A ^ B |
| 0011 | A + B |
| 0100 | A - B |
| ... | ... |
| 1000 | C0 ? A:B |
| 1001 | C1 ? A:B |
| 1010 | C2 ? A:B |
| 1011 | C3 ? A:B |
| ... | ... |
| 1111 | UNARY OPERATION ON A |

1002 — row 0010
1004 — row 1000

Fig. 10

EFFICIENT ARITHMETIC LOGIC UNITS

RELATED APPLICATION

This application is a continuation of U.S. patent application Ser. No. 12/486,114 filed Jun. 17, 2009 (now U.S. Pat. No. 8,880,856), which is incorporated herein by reference.

BACKGROUND

In a reduced instruction set computer (RISC) architecture, microprocessors execute pipelined instructions at a high clock speed. In more modern designs, however, microprocessors rely on parallelism for speed. For example, in a multi-core design, many cores in a single processor package may concurrently execute multiple threads. In another example, in a very long instruction word (VLIW) architecture, a microprocessor may execute multiple components of a microinstruction in parallel.

SUMMARY

According to one aspect, a processor may include a conditional arithmetic logic unit and a main arithmetic logic unit. The conditional arithmetic logic unit may perform a first arithmetic logic operation to generate a first result, and output the first result. The main arithmetic logic unit may select input buses among a plurality of data buses that carry the first result from the conditional arithmetic logic unit, perform a second arithmetic logic operation on data provided by the selected input buses to generate a second result, and write the second result in a storage component.

According to another aspect, a method may include performing a first arithmetic logic operation at a first arithmetic logic unit to generate a first result, outputting the first result to a first operand selector of a second arithmetic logic unit, selecting, at the first operand selector, a first operand for the second arithmetic logic unit, selecting a second operand for the second arithmetic logic unit, extracting a field from the selected second operand, performing a second arithmetic logic operation on the selected first operand and the selected second operand to generate a second result, and writing the second result to a component.

According to yet another aspect, a device may include means for performing a first arithmetic logic operation to generate a first result, means for outputting the first result, means for selecting input data from among data that include the first result, means for performing a second arithmetic logic operation on the selected input data to produce a second result, and means for writing the second result in a memory.

According to yet another aspect, a processor may include a conditional arithmetic logic unit and a main arithmetic logic unit. The conditional arithmetic logic may evaluate a condition of a conditional instruction to produce a condition code, and output the condition code. The main arithmetic logic unit may select a first input operand and a second input operand, perform an arithmetic logic operation on the first and second input operands based on the condition code, and write a result of performing the arithmetic logic operation to a component.

BRIEF DESCRIPTION OF THE DRAWINGS

The accompanying drawings, which are incorporated in and constitute a part of this specification, illustrate one or more embodiments described herein and, together with the description, explain the embodiments. In the drawings:

FIG. 6 is a block diagram of exemplary fields that may be included in an instruction register of FIG. 5;

FIG. 10 is a table of exemplary MALU operations that may be specified by a field in the instruction register of FIG. 5;

DETAILED DESCRIPTION OF PREFERRED EMBODIMENTS

The following detailed description refers to the accompanying drawings. The same reference numbers in different drawings may identify the same or similar elements. The term "packet," as used herein, may include a packet, a datagram, and/or a cell; a fragment of a packet, a datagram, and/or a cell; and/or another type of data. As used herein, the term "microinstruction" may include a microcode instruction. The term "memory device," as used herein, may refer to dynamic memory, such as registers, on-chip memory (e.g., on-board cache), random access memory (RAM), and static RAM (SRAM), for storing data and machine-readable instructions. Depending on context, "memory device" may also refer to static memory, such as read only memory (ROM), or storage devices, such as a floppy disk, Compact Disk (CD) ROM, CD read/write (R/W) disc, and/or flash memory, as well as other types of storage devices.

Figure 1:
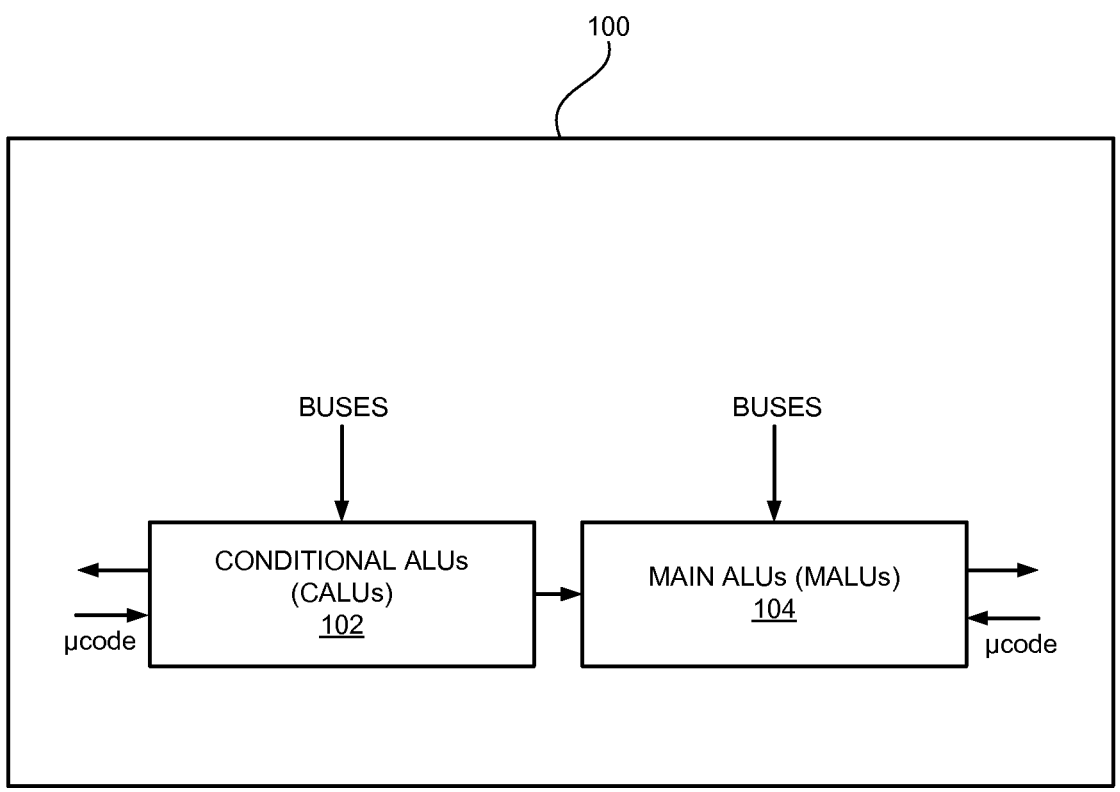
FIG. 1 is a block diagram illustrating exemplary concepts described herein.

As described below, a device may include efficient arithmetic logic units (ALUs). FIG. 1 is a block diagram that illustrates concepts described herein. As shown, the device may include a processor 100. Processor 100 may include hardware, software, or a combination of hardware and software that may perform processing tasks.

In FIG. 1, processor 100 may include conditional arithmetic logic units (CALUs) 102 (herein individually referred to as CALU 102) and main arithmetic logic units (MALUs) (herein individually referred to as MALU 104). Although not illustrated in FIG. 1, the device may include other components (e.g., a memory external to processor 100, a network interface, etc.).

CALU 102 may include components for selecting fields from input buses, performing arithmetic/logic operations on the selected fields to evaluate conditions of a conditional instruction (e.g., "(x>y)" in "if (x>y) y=10"), or providing data results of evaluating the operations to another component (e.g., MALU 104) in processor 100. MALU 104 may include components for selecting fields from input buses, performing arithmetic/logic operations on the selected inputs, including data from CALU 102, and writing the result of the operations to other components (e.g., general purpose registers (GPRs), a memory, etc.) within or external to processor 100.

By performing field selections at CALU 102 and MALU 104, by evaluating a conditional instruction in CALU 102, and by MALU 104 using the conditional result from CALU 102 to either complete or suppress the write of its result data to other components, processor 100 may save clock cycles in performing microinstructions.

Figure 2:
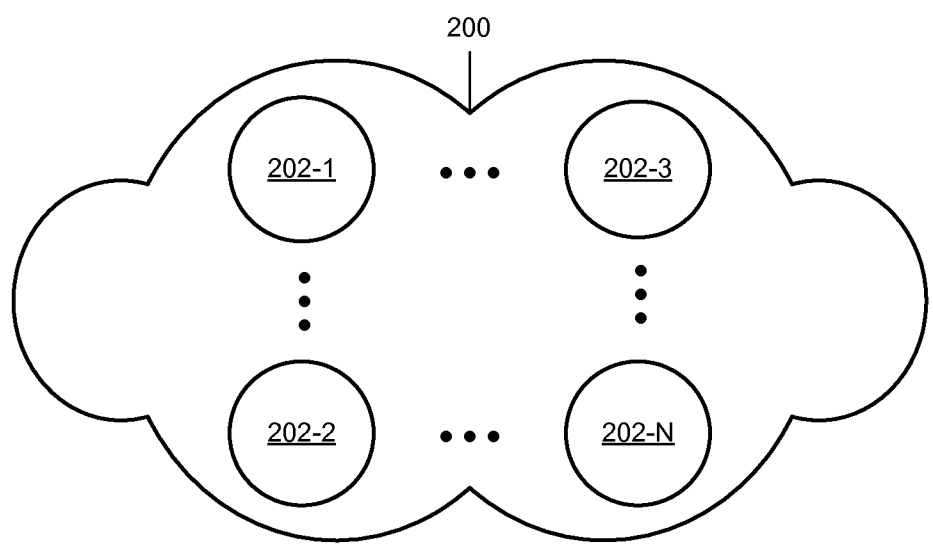
FIG. 2 is a diagram of an exemplary network in which concepts described herein may be implemented.

FIG. 2 illustrates a network 200 in which concepts described herein may be implemented. Network 200 may include the Internet, an intranet, a local area network (LAN), a wide area network (WAN), a metropolitan area network (MAN), a cellular network, a public switched telephone network (PSTN), an ad hoc network, any other network, or a combination of one or more networks.

As shown in FIG. 2, network 200 may include devices 202-1 through 202-N (individually referred to herein as a "device 202-x"). Device 202-x may include, for example, device 100, a router, a switch, a gateway, a server, a personal computer, a mobile computer (e.g., a laptop computer, a cell phone, etc.), etc. Although device 202-x may be implemented as any computer-like device, in the following description, device 202-x will be described in terms of a router/switch.

Figure 3:
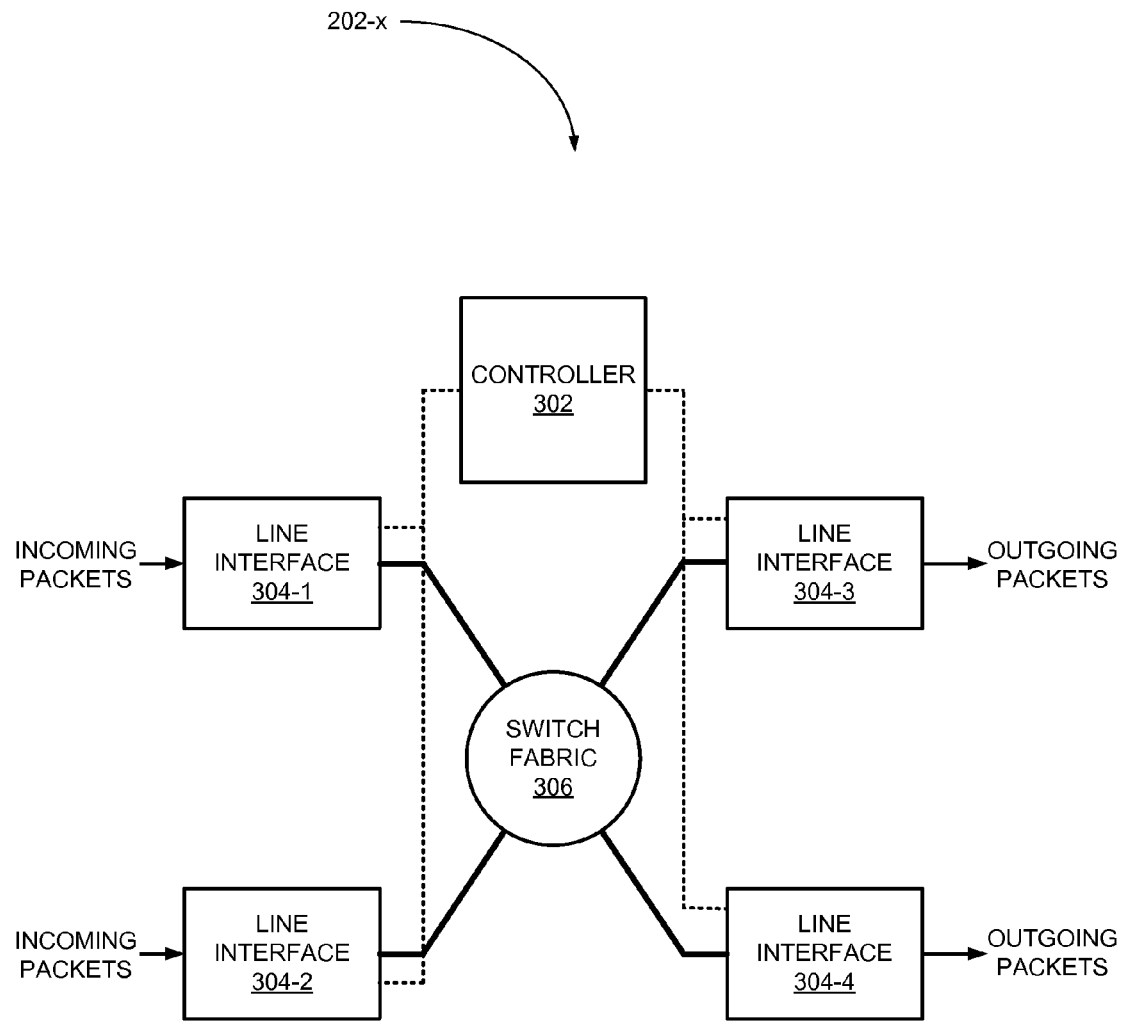
FIG. 3 is a block diagram of an exemplary device of FIG. 2.

FIG. 3 illustrates exemplary components of device 202-x. As shown, device 202-x may include a controller 302, line interfaces 304-1 through 304-4 (collectively referred to herein as "line interfaces 304" and individually as "line interface 304-x"), and a switch fabric 306.

Controller 302 may include one or more components for managing routes and/or types of information that may require centralized processing. For example, controller 302 may manage routes (e.g., may accept or disseminate routes to other devices 202) in accordance with routing/signaling protocols, may receive and process statistics related to packets, and/or may process packet samples from other components of device 202-x (e.g., from line interfaces 304). In another example, controller 302 may provide functionalities related to distributing information (e.g., rules for classifying packets) to other components of device 202-x.

Line interface 304-x may include one or more components for receiving packets from devices in network 200 and for transmitting packets to other devices in network 200. In addition, line interface 304-x may forward packets, classify packets, redirect packets to other components in device 202-x, manage a table of packet statistics, and/or sample packets.

Switch fabric 306 may include one or more switches for conveying packets from line interfaces 304 and/or other modules of device 202-x (not shown) to line interfaces 304 and/or to the other modules.

Device 202-x may include fewer, additional, and/or different components than shown in FIG. 3. For example, device 202-x may include additional or fewer line interfaces or additional controllers. Device 202-x may further include one or more modules (not shown) that may connect to switch fabric 306 and may perform various network services. For example, device 202-x may include a firewall service module, an intrusion detection service module, an encryption/decryption service module, and/or other types of service modules.

Figure 4:
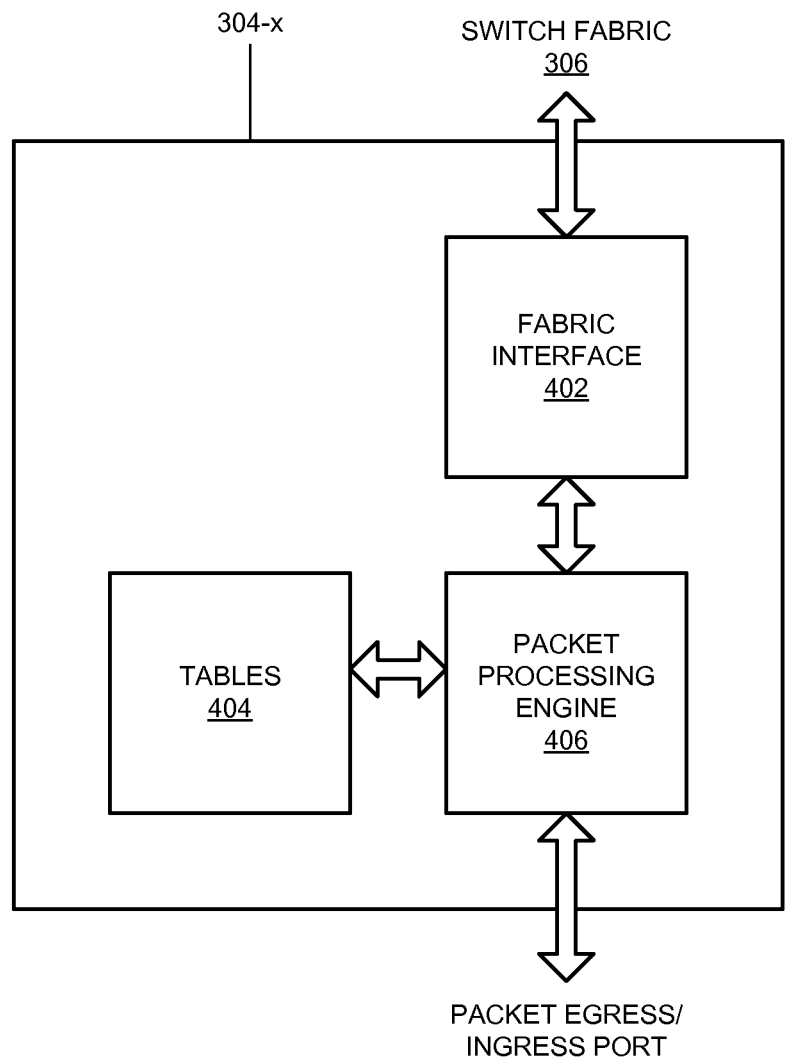
FIG. 4 is a functional block diagram of an exemplary line interface of FIG. 3.

FIG. 4 is a block diagram of exemplary functional components of line interface 304-x. As shown, line interface 304-x may include a fabric interface 402, tables 404, and a packet processing engine 406. Although FIG. 4 shows exemplary functional components of line interface 304-x, in other implementations, line interface 304-x may include fewer, different, or additional functional components than those depicted in FIG. 4. For example, in one implementation, line interface 304-x may include a communication interface located between packet processing engine 406 and packet egress/ingress port.

Fabric interface 402 may include hardware, software, or a combination of hardware and software that provide an interface to switch fabric 306. For example, fabric interface 402 may include one or more buffers (not shown) for temporarily storing augmented packets (e.g., packets pre-pended with additional header information) received from packet processing engine 406. The buffers may prevent the packets from being dropped if a bottleneck (e.g., a processing delay) develops on a line interface-to-line interface path during packet transport.

Tables 404 may include a classification table, a forwarding table, and/or any other table that may be used for processing packets. A classification table may include rules for categorizing a packet based on a packet header. Examples of classification rules may include rules for performing an access control list lookup for security purposes, rules for performing policy-based routing (e.g., if a packet header is a telephony packet, the classification rules may route the packet from one location to another location via an asynchronous transfer mode (ATM) circuit), and/or rules for rendering differentiated quality of service (QoS). A forwarding table may include information for identifying an egress line interface to forward an incoming packet to a network node based on the packet's network destination address.

Packet processing engine 406 may include hardware, software, or a combination of hardware and software that forwards and/or classifies a packet received at line interface 304-x. Packet processing engine 406 may perform a lookup of tables 404 (e.g., of a forwarding table or of a classification table), may obtain a packet descriptor that includes a forwarding address (e.g., a destination switch fabric port, a destination network port, etc.) and information for processing the packet, may sample the packet, and/or may manage the sampled packet and/or packet statistics.

In processing the packet, packet processing engine 406 may perform series of actions that may be specified by microinstructions. The microinstructions may be produced by compiling source code for an application or for part of an operating system, such as, for example, Juniper Operating System (JUNOS), Cisco Internet Operating System (IOS), etc. In addition, packet processing engine 406 may execute the microinstructions in one or more threads or processes.

Figure 5:
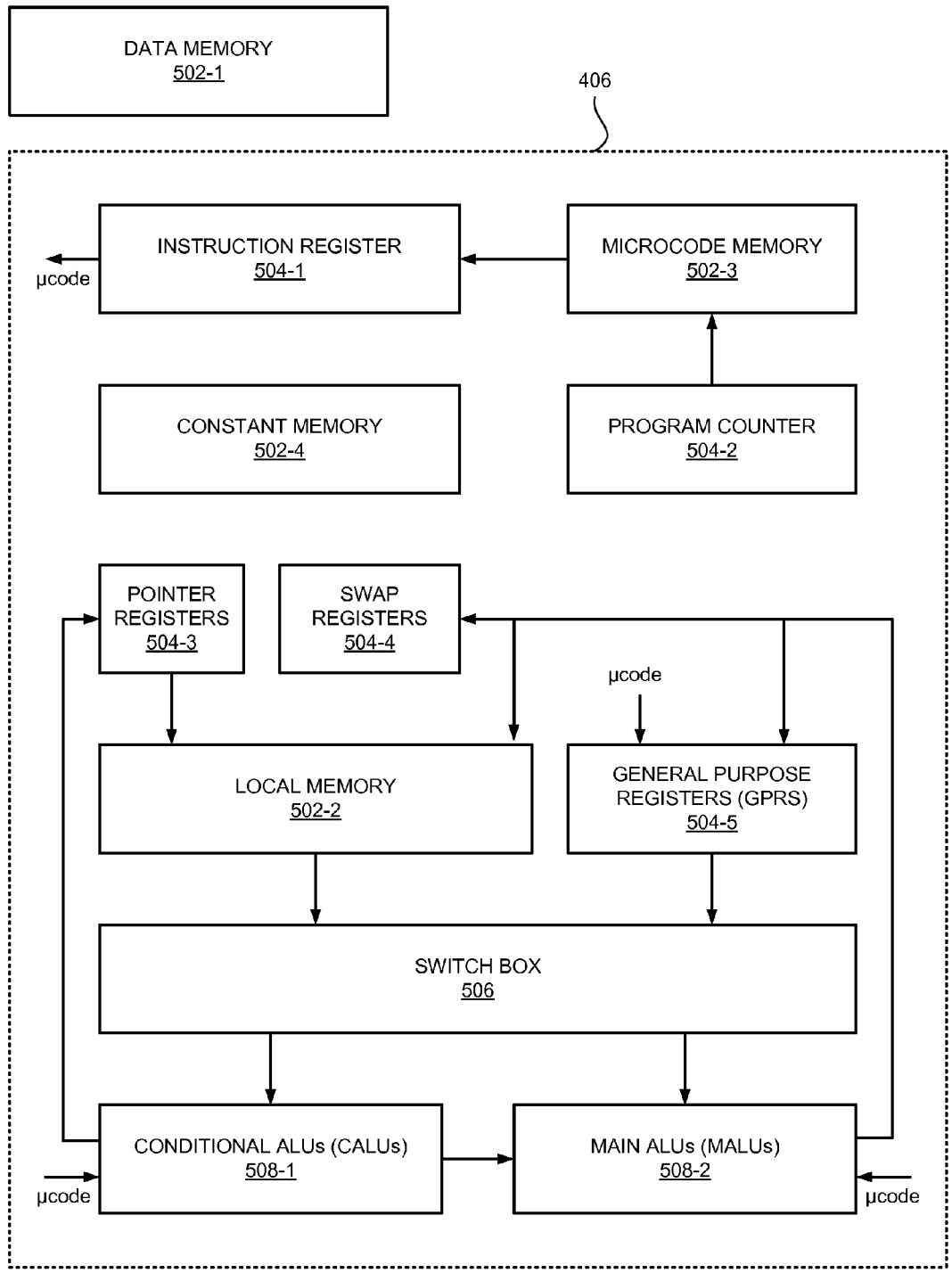
FIG. 5 is a functional block diagram of an exemplary packet processing engine of FIG. 4 and a data memory.

FIG. 5 is a block diagram of exemplary functional components of packet processing engine 406 and a data memory 502-1. As shown, packet processing engine 406 may include a local memory 502-2, a microcode memory 502-3, an instruction register 504-1, a program counter 504-2, pointer registers 504-3, swap registers 504-4, general purpose registers (GPRs) 504-5, a switch box 506, CALUs 508-1, and MALUs 508-2. Although FIG. 5 shows exemplary functional components of packet processing engine 406, in other implementations, packet processing engine 406 may include fewer, different, or additional functional components than depicted in FIG. 5. For example, in one implementation, a cache and a dynamic memory may replace memories 502-1 through 502-3. Furthermore, packet processing engine 406 may include different data paths than the data paths depicted in FIG. 5.

Data memory 502-1, which, in one implementation, is not be included in packet processing engine 406, may include a memory device that may store a forwarding database (e.g., a forwarding information base (FIB)), routing policies, multiple instruction sets, etc. In some implementations, data memory 502-1 may be large relative to other memories (e.g., local memory 502-2), and, consequently, may be implemented off-chip (e.g., on a different semiconductor chip than the one on which packet processing engine 406 is implemented). In such implementations, accessing data memory 502-1 by packet processing engine 406 can be slower than accessing other memories, such as local memory 502-2 or microcode memory 502-3.

Local memory 502-2 may include a memory device that may store packet-related information (e.g., packet headers) and/or other types of data. Microcode memory 502-3 may include a memory device that may store microinstructions. In some implementations, microcode memory 502-3 may be configured to store very long instruction word (VLIW) instructions. Constant memory 502-4 may include a memory device that may store constant values. In one implementation, constant memory 502-4 may output one or more constants, based on fields of a microinstruction.

Instruction register 504-1 may include a memory device that may store a currently executing microinstruction, which may have been retrieved from microcode memory 502-3. Program counter 504-2 may include a memory device that may store an address of the currently executing microinstruction, and may be used to push/receive the address onto/from a call stack. In another implementation, program counter 504-2 may be used to calculate an address of the next microinstruction to be loaded into instruction register 504-1. Pointer registers 504-3 may include a memory device that may store information that may be used to access local memory 502-2. For example, contents of pointer registers 504-3 may designate a specific address in local memory 502-2.

Swap registers 504-4 may include a memory device that may include information for accessing an instruction within an instruction set in data memory 502-1. By use of swap registers 504-4, a set of instructions may be "swapped in" for execution. In another implementation, different types of storage (e.g., a dynamic memory, onboard cache, etc.) may be used in place of swap registers 504-4.

General purpose registers (GPRs) 504-5 may include a memory device that may store data and/or addresses. Specific fields within a microinstruction may select specific GPRs 504-5 that feed buses into switch box 506. Switch box 506 may include a multiplexer or similar component with a mechanism for selecting data from specific buses (e.g., buses from GPRS 504-5, data memory 502-1 (not shown), local memory 502-2. etc.). The selected data may be directed to other components, such as, for example, CALUs 508-1 or MALUs 508-2.

CALUs 508-1 may include arithmetic logic units (e.g., components that may perform arithmetic and logic operations within a processor). CALU 508-1 may select fields from input buses, compute conditions that drive branch decisions in a microinstruction, and/or provide input to another component of packet processing engine 406 (e.g., MALUs 508-2). The computation may include arithmetic and/or logic operations (e.g., adding two numbers) performed on fields and sub-fields of a microinstruction, on contents of GPRs 504-5, on contents of a portion of local memory 502-2 and/or data memory 502-1, and/or on constants (e.g., numbers, strings, etc.) from constant memory 502-4. Although, in a different implementation, CALUs 508-1 may include any number of individual CALUs, in the following description, it will be assumed that CALUs 508-1 include four individual CALUs.

MALUs 508-2 may include components for selecting fields from input buses and arithmetic logic units that perform arithmetic/logic operations on fields and subfields of a microinstruction, on contents of GPRs 504-5, on contents of a portion of local memory 502-2 and/or data memory 502-1, on outputs from CALUs 508-1, and/or on constants from constant memory 502-4. The output of MALUs 508-2 may be written to GPRs 504-5, data memory 502-1, local memory 502-2, and/or swap registers 504-4. Although, in a different implementation, MALUs 508-2 may include any number of individual MALUs, in the following, it will be assumed that MALUs 508-2 include two individual MALUs.

In FIG. 5, during an operation of packet processing engine 406, a microinstruction may be read into instruction register 504-1. Various fields of the microinstruction in instruction register 504-1 may select specific GPRs 504-5, a portion of local memory 502-2, and/or a portion of data memory 502-1. In addition, the microinstruction may drive computations at CALUs 508-1 and MALUs 508-2.

FIG. 6 is a block diagram of exemplary fields that may be included in instruction register 504-1. As shown, instruction register 504-1 may include LMA field 602-0, LMB field 602-1, SA0 field 604-0, SA1 field 604-1, REA field 606-0, REB field 606-1, ROA field 608-0, ROB field 608-1, KA field 610-0, KB field 610-1, CA0 field 612-0 through CA3 field 612-3 (herein collectively referred to as CAx fields 612 and individually as CAx field 612-$x$), CFE0 field 614-0 through CFE3 field 614-3 (herein collectively referred to as CFEx fields 614 and individually as CFEx field 614-$x$), CB0 field 616-0 through CB3 field 616-3 (herein collectively referred to as CBx fields 616 and individually as CBx field 616-$x$), COP0 field 618-0 through COP3 field 618-3 (herein collectively referred to as COPx fields 618 and individually as COPx field 618-$x$), CW field 620, MA0 and MA1 fields 622-0 and 622-1 (herein collectively referred to as MAx fields 622 and individually as MAx field 622-$x$), MFE0 and MFE1 fields 624-0 and 624-1 (herein collectively referred to as MFEx fields 624 and individually as MFEx field 624-$x$), MB0 and MB1 fields 626-0 and 626-1 (herein collectively referred to as MBx fields 626 and individually as MBx field 626-$x$), MOP0 and MOP1 fields 628-0 and 628-1 (herein collectively referred to as MOPx fields 628 and individually as MOPx field 628-$x$), MFI0 and MFI1 fields 630-0 and 630-1 (herein collectively referred to as MFIx fields 630 and individually as MFIx field 630-$x$), MW0 and MW1 fields 632-0 and 632-1 (herein collectively referred to as MWx fields 632 and individually as MWx field 632-$x$), and other fields 634. Depending on the implementation, instruction register 504-1 may include fewer, additional, or different fields than those illustrated in FIG. 6.

Each of LMA field 602-0 and LMB field 602-1 may store an address for accessing local memory 502-2. In some instances, the addresses in LMA field 602-0 and LMB field 602-1 may be stored in pointer registers 504-3. The stored addresses may then be later used to access information stored in local memory 502-2. In other instances, the addresses in LMA field 602-0 and LMB field 602-1 may be used to directly read from memory blocks, which are specified by the values in LMA and LMB fields 602-0 and 602-1, in local memory 502-2.

SA0 field 604-0 and SA1 field 604-1 may store codes that specify a variety of operations that may be used less frequently by packet processing engine 406 than other operations (e.g., a special write instruction). Specific values in SA0 field 604-0 and/or SA1 field 604-1 may modify the behavior of MALUs 508-2.

REA field 606-0 and REB field 606-1 may designate two even numbered registers in GPRs 504-5. The designated registers may output data via buses from GPRs 504-5. Similarly, ROA field 608-0 and ROB field 608-1 may designate two odd numbered registers in GPRs 504-5.

KA field 610-0 and KB field 610-1 may address constants that are stored at two addresses in constant memory 502-4. Constant memory 502-4 may output the addressed constants to other components in FIG. 5.

CAx field 612-x (one of CA0 field 612-0 through CA3 field 612-3) may store information that may be used by a CALU in CALUs 508-1 to select an input operand, among outputs from particular components in FIG. 5. CFEx field 614-x may store information that may be used by the CALU to select and use subfields within the selected input operand. CBx field 616-x may store information that may be used by the CALU to select another input operand, among outputs from other components in FIG. 5, for the CALU. COPx field 618-x may store information that may be used by the CALU to select one or more of several possible operations (e.g., addition of two operands, bitwise AND of two operands, etc.) that may be performed by the CALU. CW field 620 may control writing the output of one or more CALUs to registers.

MAx field 622-x may store information that may be used by a MALU to select an input operand, among outputs from particular components in FIG. 5, for the MALU. MFEx field 624-x may store information that may be used by the MALU to select and use subfields within the selected input operand. MBx field 626-x may store information that may be used by the MALU to select another input operand, among outputs from other components in FIG. 5. MOPx field 628-x may store information that may be used by the MALU to select one or more of several possible operations (e.g., addition of two operands, bitwise AND of two operands, etc.). MFIx 630-x may store information for selecting and formatting subfields of the output of the MALU. MWx 632-x may store information that may be used by the MALU to write the output of the MALU to data memory 502-1, local memory 502-2, and/or GPRs 504-5.

Other fields 634 may include fields such as a parity bit field, a field used for performance monitoring, etc.

Exemplary Conditional Arithmetic Logic Unit (CALU)

Figure 7:
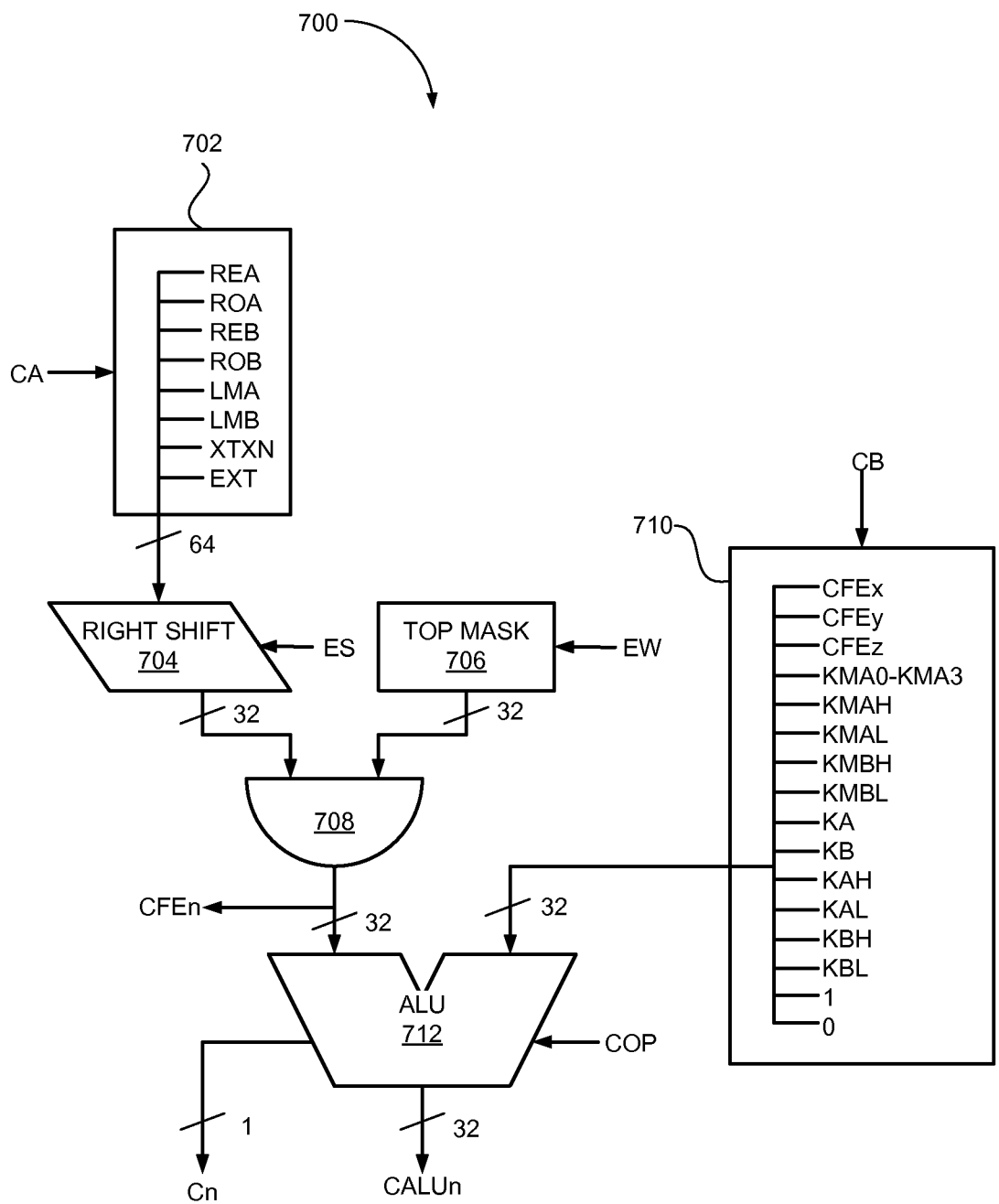
FIG. 7 is a block diagram of an exemplary conditional arithmetic logic unit (CALU) of FIG. 5.

FIG. 7 is a block diagram of an exemplary CALU 700 of CALUs 508-1. As shown, CALU 700 may include an operand selector 702, a right shift register 704, a top mask unit 706, a combiner 708, an operand selector 710, and an ALU 712. Depending on the implementation, CALU 700 may include fewer, additional, or different components than those illustrated in FIG. 7.

Operand selector 702 may include a hardware component for selecting an input operand based on a signal, which is illustrated as CA in FIG. 7. Signal CA may be obtained from microcode field CAx 612-x via data buses, and may be used to select one of the following sets of input data buses: REA, ROA, REB, ROB, LMA, LMB, XTXN, and EXT.

REA and REB may include data from even numbered GPRs 504-5 that are designated by values set in REA field 606-0 and REB field 606-1, respectively, in instruction register 504-1. Similarly, ROA and ROB may include data from odd numbered GPRs 504-5 that are designated by values set in ROA field 608-0 and ROB field 608-1, respectively. LMA and LMB may include data from local memory 502-2. The memory locations, within local memory 502-2, from which LMA and LMB are obtained, may be specified by pointer registers 504-3 or LMA field 602-0 and LMB field 602-1. XTXN and EXT may include data from other components of packet processing engine 406.

Returning to FIG. 7, right shift register 704, top mask unit 706, and combiner 708 may include components for extracting an arbitrary bit field from input buses selected at operand selector 702. As shown, right shift register 704 may shift input from operand selector 702 to the right, by a number of bits specified by an ES signal, and top mask unit 706 may generate a mask with a number of bits (e.g., 1's) specified by an EW signal. The signals ES and EW may be specified by CFEx field 614-x in instruction register 504-1. The outputs of right shift register 704 and top mask unit 706 may be bitwise AND'ed at combiner 708.

Operand selector 710 may include a hardware component for selecting an input operand based on a signal CB. Operand selector 710 may obtain CB from microcode field CBx 616-x via data buses, and use CB to select one of the following input data buses: CFEx, CFEy, CFEz, KMA0, KMA1, KMA2, KMA3, KMAH, KMAL, KMBH, KMBL, KA, KB, KAH, KAL, KBH, KBL, 1's, and 0's, Each of CFEx through CFEy may include buses that are tapped from the output of combiner 708 in another CALU of CALUs 508-1. Each of KMA0 through KMA3 may include buses from a subfield within KMA, which is a constant stored in constant memory 502-4, at an address specified by KA field 610-0 of instruction register 504-1. KMAH and KMAL may include upper and lower halves of buses from KMA. Similarly, KMBH and KMBL may include upper and lower halves of buses from KMB. KA and KB may include buses from KA field 610-0 and KB field 610-1 in instruction register 504-1. KAH and KAL may correspond to the upper and lower halves, respectively, of KA, and KBH and KBL may correspond to the upper and lower halves of KB. 1's may include buses that carry a 32-bit value of 0x00000001, and 0's may include buses that carry a 32-bit value of all zeros.

ALU 712 may include a hardware component for performing arithmetic and/or logic operations on the outputs of combiner 708 and operand selector 710. As shown in FIG. 7, the outputs of ALU 712 may include a condition code Cn and data CALUn.

Figure 8:
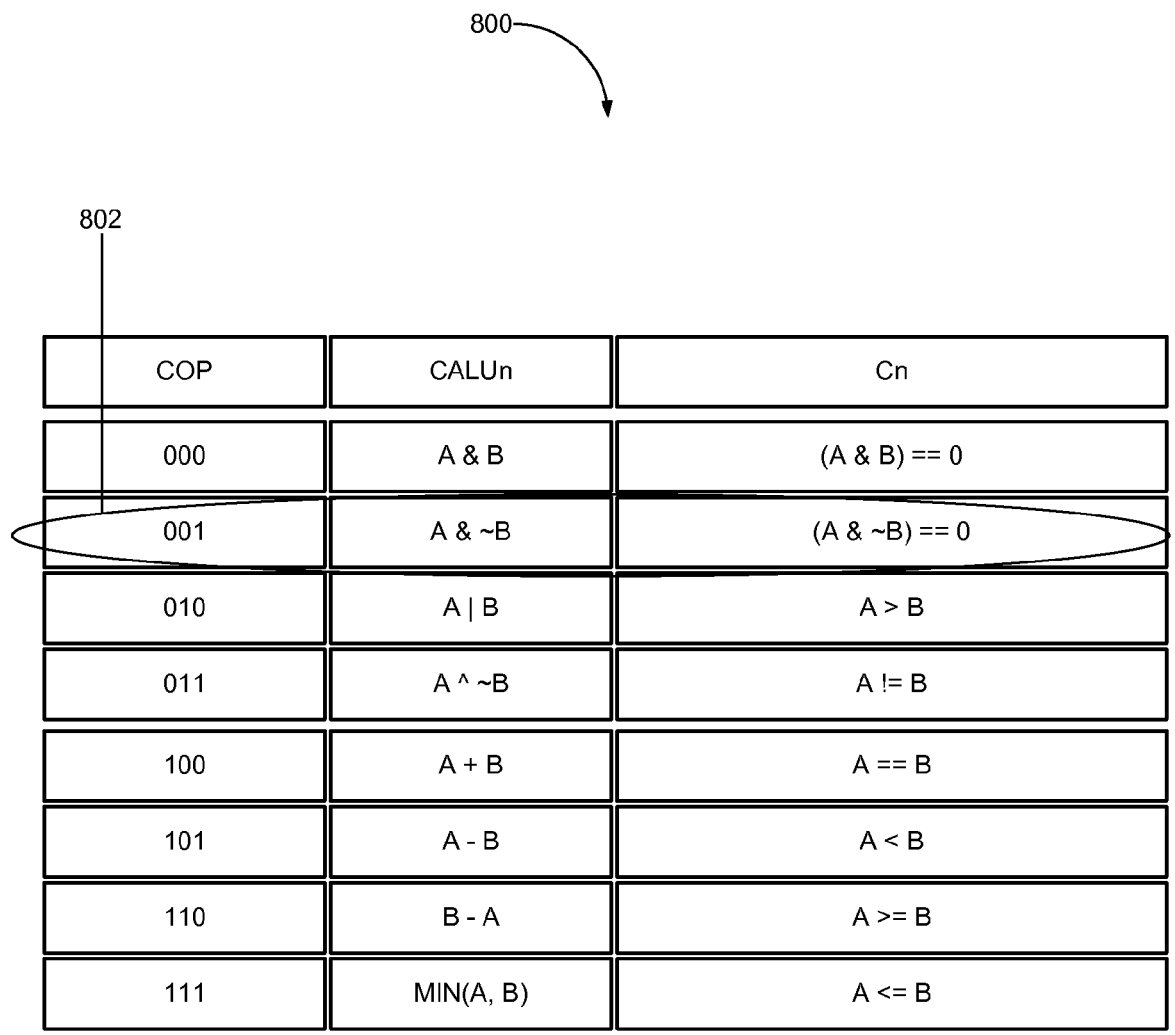
FIG. 8 shows a table of exemplary ALU operations that may be specified by a field in the instruction register of FIG. 5.

A specific operation that ALU 712 performs may depend on the value of COP, which may be obtained from COPx field 618-x. FIG. 8 shows a table 800 of exemplary ALU operations that may be specified by the COP. In table 800, letters "A" and "B" may represent the outputs of combiner 708 and operand selector 710, respectively. Depending on the design of CALU (e.g., size of the COPx field), table 800 may have more or fewer than 8 operations. Although table 800 shows 8 operations, one operation specified at row 802 is discussed below for purposes of illustration.

As shown at row 802, when the COP is "001" (see COP field of row 802), ALU 712 may compute a bitwise AND of A and ~B, where ~B is a bitwise complement of B. ALU 712 may output the result of A& ~B as signal CALUn (see A&~B in CALUn field of row 802). In addition, ALU 712 may determine whether the result of A&~B is equal to "0." If the result is equal to "0," ALU 712 may output a Cn of "1;" otherwise, ALU 712 may output a Cn of "0." This is indicated in Cn field in row 802 as "(A&~B)==0."

For each of the other operations in table 800, ALU 712 may determine the value of CALUn and Cn in a manner similar to that described for A&~B at row 802. The values of CALUn and Cn may be used to perform sequencing (e.g., determine the next microinstruction) in packet processing engine 406, used as an input to a MALU operation, and/or to perform conditional writes by the MALU.

Exemplary Main Arithmetic Logic Unit (MALU)

Figure 9:
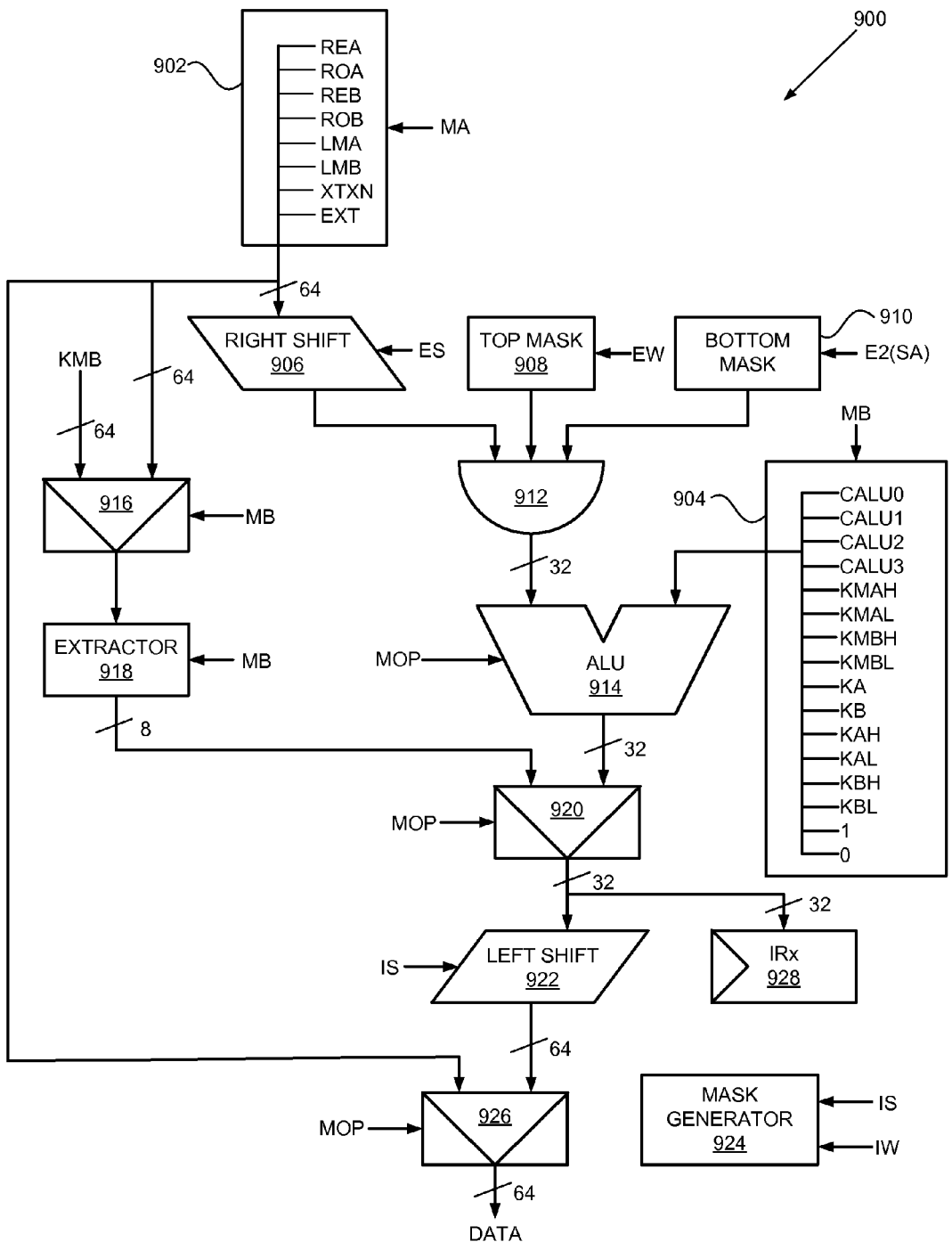
FIG. 9 is a block diagram of an exemplary main arithmetic logic unit (MALU) of FIG. 5.

FIG. 9 is a block diagram of an exemplary MALU 900 of MALUs 508-2. As shown, MALU 900 may include an operand selector 902, an operand selector 904, a right shift register 906, a top mask unit 908, a bottom mask unit 910, a combiner 912, an ALU 914, a data selector 916, a byte/nibble extractor 918, a data selector 920, a left shift register 922, a mask generator 924, a data selector 926, and an intermediate register 928. Depending on the implementation, MALU 900 may include fewer, additional, or different components than those illustrated in FIG. 9.

Operand selector 902 may include a hardware component for selecting an input operand based on a signal, which is illustrated as MA in FIG. 9. Signal MA may be obtained from microcode field MAx 622-$x$ via data buses, and may be used to select one of the following sets of input data buses: REA, ROA, REB, ROB, LMA, LMB, XTXN, and EXT. Data buses REA, ROA, REB, ROB, LMA, LMB, XTXN, and EXT are described above with reference to FIG. 7.

Operand selector 904 may include a hardware component for selecting an input operand based on a signal MB. Signal MB may be obtained from microcode field MBx 626-$x$ via data buses, and may be used to select one of the following sets of input data buses: CALU0, CALU1, CALU2, CALU3, KMAH, KMAL, KMBH, KMBL, KA, KB, KAH, KAL, KBH, KBL, 1's, and 0's.

CALU0 through CALU3 may include output data buses from four different CALUs of CALUs 508-1. KMAH, KMAL, KMBH, KMBL, KA, KB, KAH, KAL, KBH, KBL, 1's, and 0's are described above with reference to FIG. 7.

Right shift register 906, top mask unit 908, bottom mask unit 910, and combiner 912 may include components for extracting an arbitrary bit field from input buses selected at operand selector 902. Right shift register 906 may shift input from operand selector 902 to the right, by number of bits specified by a signal ES. Top mask unit 908 may generate a mask with a number of bits (e.g., 1's) specified by a signal EW. Bottom mask unit 910 may generate a mask with a number of bits specified by a signal E2. The signals ES, EW, and E2 may be specified by MFEx field 624-$x$ and SAx field 604-$x$ in instruction register 504-1. The outputs of right shift register 906, top mask unit 908, and bottom mask unit 910 may be bitwise AND'ed at combiner 912. Top mask unit 908 may set a number, corresponding to signal EW, of its least significant bits to 1 (i.e., EW specifies the number of least significant bits set to 1). All other higher-order bits of the mask generated by top mask unit 908 may be set to 0. Bottom mask unit 910 may clear a number, corresponding to signal E2, of its least significant bits to zero (i.e., E2 specifies the number of least significant bits cleared to zero). All other higher-order bits of the mask generated by bottom mask unit 910 may be set to 1. After a bit-wise AND of the masks generated by top mask unit 908 and bottom mask unit 910 is performed, the result has its E2 least significant bits cleared to 0, the next EW-E2 bits set to 1, and all higher-order bits cleared to 0, thus, effectively performing a left-shift operation.

ALU 914 may include a hardware component for performing arithmetic and/or logic operations on the outputs of combiner 912 and operand selector 904. The specific operation that ALU 914 performs may depend on the value of MOP, which is obtained from MOPx field 628-$x$. FIG. 10 shows a table 1000 of exemplary ALU operations that may be specified by the MOP. In table 1000, letters "A" and "B" may represent the outputs of combiner 912 and operand selector 904, respectively. Although table 1000 shows a number of different operations, operations specified at rows 1002 and 1004 are discussed below for purposes of illustration.

As shown at row 1002, when the MOP is "0010" (see the MOP field of row 1002), ALU 914 may compute a bitwise EXCLUSIVE-OR of operands A and B. In contrast to ALU 712, ALU 914 may not output a condition code. Row 1004 shows that, when the MOP is "1000," ALU 914 may output either A or B, depending on the value of condition code CO (see FIG. 7) from CALU 700.

Returning to FIG. 9, data selector 916, byte/nibble extractor 918, and data selector 920 may support a set of unary operations (see the bottom row of table 1000 in FIG. 10). When MALU 900 performs the unary operation, data selector 916 may select either KMB or the output of operand selector 902. Byte/nibble extractor 918 may extract eight or four bits from the output of data selector 916, and pass the result to data selector 920. Data selector 920 may output the result of byte/nibble extractor 918 when MALU 900 performs the unary operation. When MALU 900 performs a non-unary operation, data selector 920 may select the output of ALU 914.

Left shift register 922 and mask generator 924 may form a component for formatting a portion of the output of data selector 920 when the output is to be written to particular components of packet processing engine 406, such as GPRs 504-5 or local memory 502-2. In such instances, left shift register 922 may align the output of data selector 920 to a proper byte boundary (e.g., 64 byte boundary) in accordance with signal IS. Mask generator 924 may output a mask in accordance with signals IS and IW. The signals IS and IW may be derived from the values in MFIx field 630-$x$ in an implementation dependent manner. In one implementation, both the outputs of left shift register 922 and mask generator 924 may be generated in accordance with IS and IW and used in writing to local memory 502-2 and/or GPRs 504-5.

Data selector 926 may output either the result of left shift register 922 or the output of operand selector 902. When data selector 926 selects the output of operand selector 902, the selected operand may effectively bypass ALU 914.

IRx 928 may temporarily store the output of data selector 920.

In the above, the output of MALU 900 may be written to different components of or components outside of packet processing engine 406 (e.g., local memory 502-2 or data memory 502-1). Data that is actually written may be dependent on bit values of MWx field 632-$x$ of instruction register 504-1. For example, a value of "110010" at MW0 field 632-0 may indicate that MALU 900 may write its output to local memory 502-2, at a memory location specified by the value in LMA field 602-0 in instruction register 504-1. In some instances, the MALU 900's write operation may depend on the values of CALUs' condition codes (e.g., Cn in FIG. 7).

Exemplary Processes for Performing CALU and MALU Operations

Figure 11:
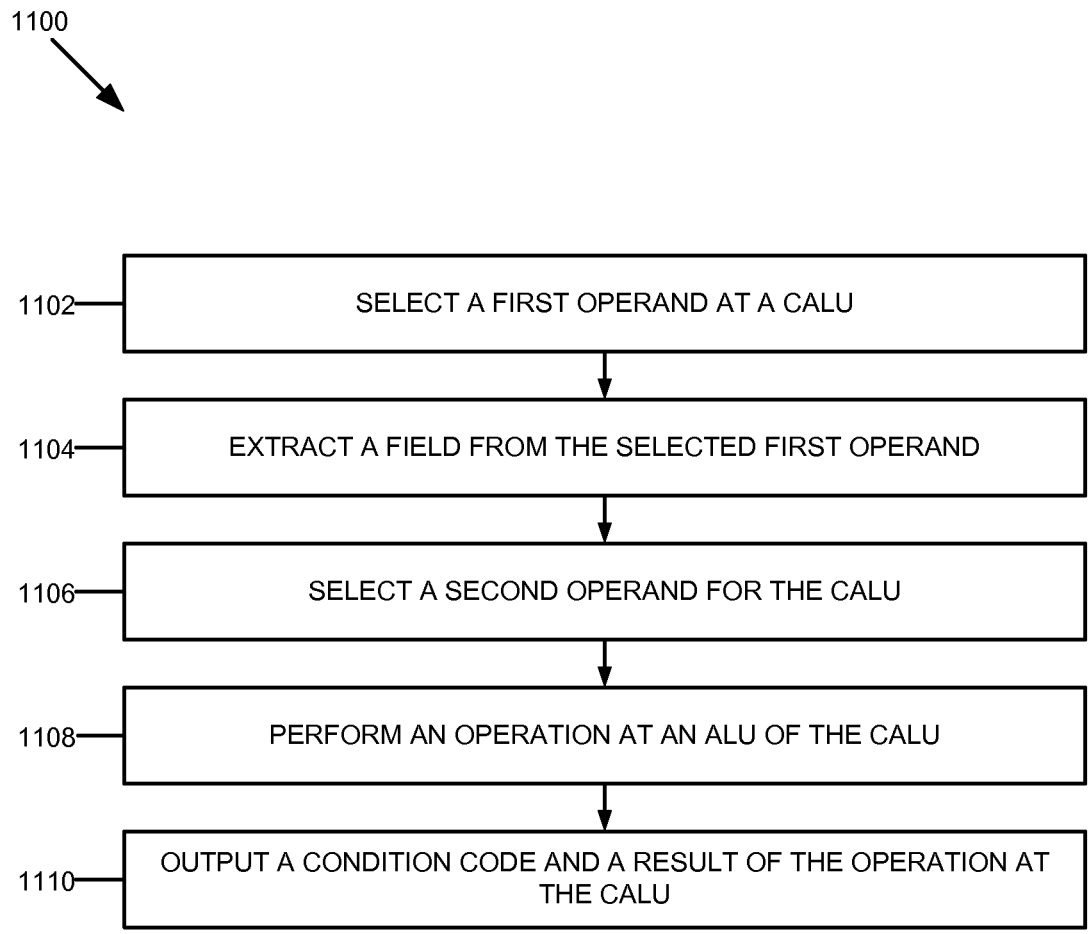
FIG. 11 is a flow diagram of an exemplary process for performing a CALU operation.

FIG. 11 shows a flow diagram of an exemplary process 1100 for performing a CALU operation. Assume that packet processing engine 406 is executing microinstructions, and that components in 406 are receiving signals from one another via data buses. In addition, assume that instruction register 504-1 has loaded in a microinstruction.

As shown in FIG. 11, process 1100 may begin with a selection of a first operand (block 1102). For example, operand selector 702 in CALU0 may select REA, ROA, REB, ROB, LMA, LMB, XTXN, or EXT.

A field may be extracted from the selected first operand (block 1104). For example, right shift register 704, top mask unit 706, and a combiner 708 in CALU0 may extract a field in accordance with CFE0 field 614-0, as described above in connection with CALU 700. The output of combiner 708 (e.g., CFE0) may be tapped and input to other CALUs in CALU 508-1.

A second operand may be selected (block 1106). For example, operand selector 710 in CALU0 may select a second operand among CFE1, CFE2, CFE3, KMA0, KMA1, KMA2, KMA3, KMAH, KMAL, KMBH, KMBL, KA, KB, KAH, KAL, KBH, KBL, 1's, and 0's, in accordance with CB0 field 616-0.

An operation may be performed at an ALU of the CALU (block 1108). For example, ALU 712 in CALU0 may perform an arithmetic and/or logic operation in accordance with COP0 field 618-0.

A condition code and a data result of the operation may be output at the CALU (block 1110). For example, CALU0 may output a condition code and the data result of the operation. As discussed above in connection with table 800, the condition code may indicate a result of performing a specific test. The condition code and the data result of the CALU operation may be provided to other components of packet processing engine 406, such as MALUs 508-2.

Figure 12:
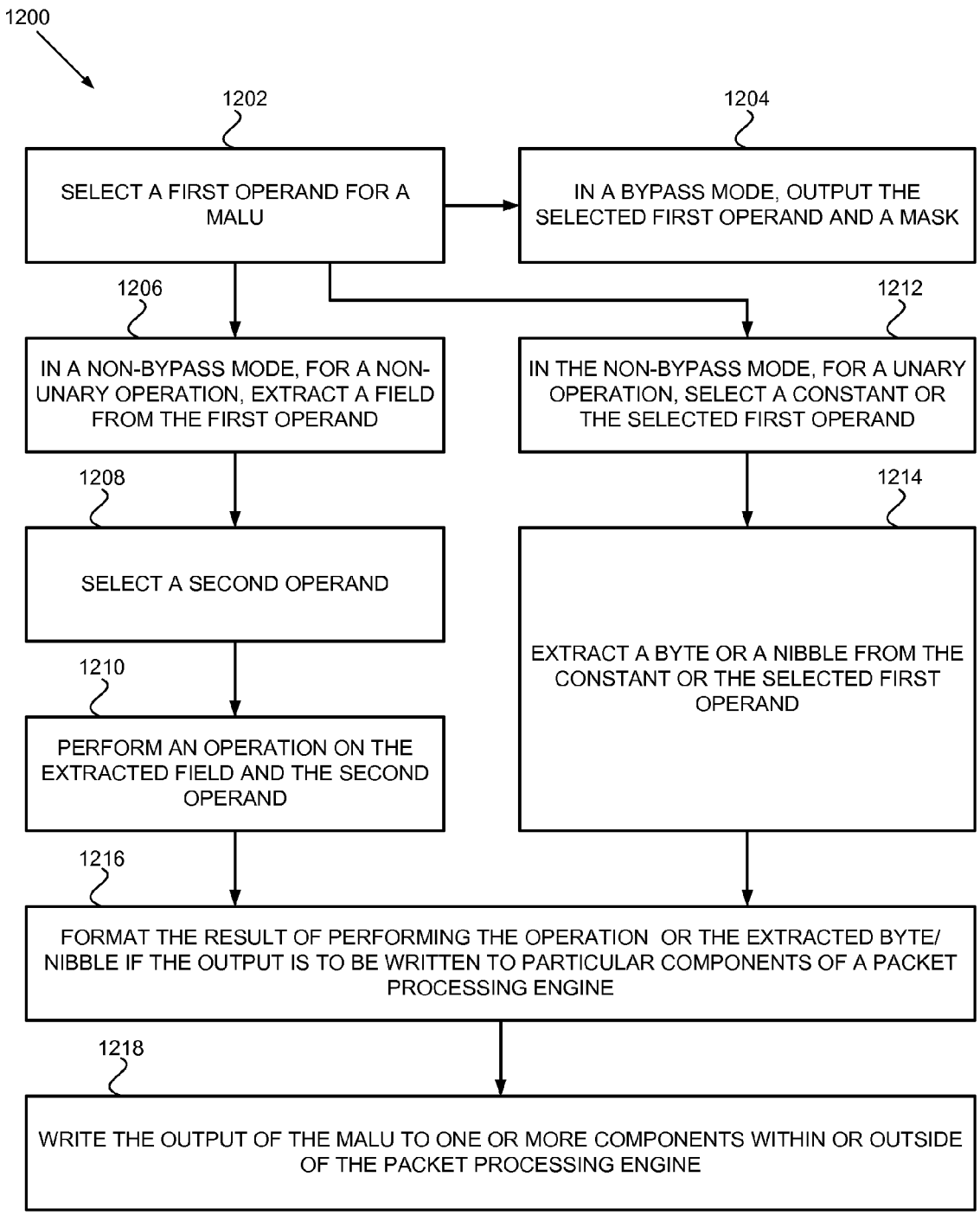
FIG. 12 is a flow diagram of an exemplary process for performing a MALU operation.

FIG. 12 shows a flow diagram of an exemplary process 1200 for performing a MALU operation. Assume that packet processing engine 406 is executing microinstructions, components in packet processing engine 406 are receiving signals from one another via data buses, and instruction register 504-1 has loaded in a microinstruction.

A first operand may be selected (block 1202). For example, operand selector 902 of MALU1 may select REA, ROA, REB, ROB, LMA, LMB, XTXN, or EXT. In addition, at block 1202, depending on an operating mode of MALU 900, process 1200 may branch to block 1204, block 1206, or block 1212. The operating mode may be determined based on the values of certain fields within instruction register 504-1.

In a bypass mode, the selected first operand and a mask may be output (block 1204). The term "bypass mode," as used herein, may refer to a mode in which arithmetic/logic operation of MALU 900 is bypassed. The mask may be output from mask generator 924.

In a non-bypass mode, for a non-unary operation, a field may be extracted from the selected first operand (block 1206). The term "unary operation," as used herein, may refer to an operation that may be performed on a single operand. For example, converting a positive number into a negative number may be considered a unary operation. Whether an operation is a unary operation or not may depend on the values of the MOP (see table 1000). Returning to block 1206, in extracting the field from the first operand, combiner 912 may apply masks that are provided by top mask unit 908 and bottom mask unit 910 to the output of right shift register 906.

For the non-unary operation, a second operand may be selected (block 1208). For example, operand selector 904 may select the second operand.

The non-unary operation may be performed on the extracted field and the second operand (block 1210). For example, ALU 914 may perform an arithmetic/logic operation on the output of combiner 912 and operand selector 904. The specific arithmetic/logic operation that ALU 914 performs may depend on the value of MOP field 628-x of instruction register 504-1.

In the non-bypass mode, for a unary operation, a constant or the selected first operand may be selected (block 1212). For example, data selector 916 may select KMB or the output of operand selector 902.

For the unary operation, a byte/nibble may be extracted from the constant or the selected first operand (block 1214). For instance, byte/nibble extractor 918 may select a byte or a nibble from the output of data selector 916, which may output either the first operand or the constant.

The output of the non-unary operation (see block 1210) or the extracted byte/nibble (see block 1214) may be formatted if the output is to be written to particular components of packet processing engine 406 (block 1216). For example, left shift register 922 and mask generator 924 may determine which bits of the output of data selector 920 are stored if the output is to be written to GPRs 504-5 or to local memory 502-2.

The output of the MALU may be written to one or more components within or outside of the processor (block 1218). For example, the output of data selector 926 may be masked with the output of mask generator 924 and written to local memory 502-2. In some instances, the writing may depend on the values of MWx field 632. In other instances, the writing may depend on the values of Cn (see FIG. 7).

In the above, by performing operand selections at CALU 700 and MALU 900, by evaluating conditions of a conditional instruction in CALU 700 and inputting the result to MALU 900, and by writing a result from MALU 900 to other components of a packet processing engine, the packet processing engine may save clock cycles by performing multiple operations in a single microinstruction that would require many instructions in a typical RISC processor.

CONCLUSION

The foregoing description of implementations provides illustration, but is not intended to be exhaustive or to limit the implementations to the precise form disclosed. Modifications and variations are possible in light of the above teachings or may be acquired from practice of the teachings.

For example, while CALU 700 and MALU 900 have been described as components in packet processing engine 406, CALU 700 and MALU 900 may be implemented as part of other types of processors.

In another example, while series of blocks has been described with regard to exemplary processes illustrated in FIGS. 11 and 12, the order of the blocks may be modified in other implementations. In addition, non-dependent blocks may represent acts that can be performed in parallel to other blocks.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the implementations described herein unless explicitly described as such. Also, as used herein, the article "a" is intended to include one or more items. Where one item is intended, the term "one" or similar language is used. Further, the phrase "based on" is intended to mean "based, at least in part, on" unless explicitly stated otherwise.

What is claimed is:

1. A device comprising:
a conditional arithmetic logic unit, implemented at least partially in hardware, to:
perform, based on a microinstruction associated with processing received data, a first operation to generate a first result, and
output the first result via a particular bus of a plurality of buses; and
a main arithmetic logic unit, implemented at least partially in hardware, to:
select, based on the microinstruction, the particular bus from the plurality of buses to determine the first result as corresponding to a first input,
select, based on the microinstruction, a set of input buses from the plurality of buses to determine a second input,
perform a second operation on the first input and the second input to generate a second result, and
output, based on the microinstruction, the second result, the received data being processed based on the second result.

2. The device of claim 1, where, when outputting the first result, the conditional arithmetic logic unit is to:
output, via the particular bus, the first result and a condition code,
where the condition code indicates that the first result satisfies a condition associated with the first operation.

3. The device of claim 2, where, when outputting the second result, the main arithmetic logic unit is to:
output the second result based on the condition code.

4. The device of claim 1, where, when performing the first operation, the conditional arithmetic logic unit is to:
perform one of:
an arithmetic operation, or
a logic operation.

5. The device of claim 1, where the main arithmetic logic unit is further to:
determine that the second result is to be output to a particular component of the device; and
format the second result based on the second result being output to the particular component.

6. The device of claim 1, where the main arithmetic logic unit is further to:
extract, based on the microinstruction, a field from the second input; and
where, when performing the second operation, the main arithmetic logic unit is to:
perform the second operation on the first input and the field extracted from the second input.

7. The device of claim 1, where
the device comprises a processor, and
when outputting the second result, the main arithmetic logic unit is to:
output the second result to a device that is external to the processor.

8. A method comprising:
performing, by a first arithmetic logic unit and based on a microinstruction associated with processing data received at a network device, a first operation to generate a first result,
the first arithmetic logic unit being implemented at least partially in hardware;
outputting, by the first arithmetic logic unit, the first result via a particular bus of a plurality of buses;
selecting, by a second arithmetic logic unit and based on the microinstruction, the particular bus from the plurality of buses to determine the first result as corresponding to an input,
the second arithmetic logic unit being implemented at least partially in hardware;
performing, by the second arithmetic logic unit, a second operation on the input to generate a second result; and
outputting, by the second arithmetic logic unit and based on the microinstruction, the second result,
the data being processed by the network device based on the second result.

9. The method of claim 8, where the input comprises a first input, the method further comprising:
selecting, by the second arithmetic logic unit and based on the microinstruction, a set of input buses from the plurality of buses to determine a second input; and
where performing the second operation includes:
performing, by the second arithmetic logic unit, the second operation on the first input and the second input to generate the second result.

10. The method of claim 9, where performing the second operation further includes:
performing, on the first input and the second input, one of:
an arithmetic operation, or
a logic operation.

11. The method of claim 8, where performing the second operation includes:
performing a unary operation.

12. The method of claim 8, where outputting the first result includes:
outputting, by the first logic unit, the first result and a condition code,
where the condition code indicates that the first result satisfies a condition associated with the first operation.

13. The method of claim 12, where outputting the second result includes:
outputting the second result based on the condition code.

14. The method of claim 8, where performing the second operation includes:
determining that the second arithmetic logic unit is associated with a bypass mode; and
where outputting the second result includes:
outputting the input and a mask based on the second arithmetic logic unit being associated with the bypass mode.

15. A non-transitory computer-readable medium storing instructions, the instructions comprising:
one or more instructions that, when executed by a network device, cause the network device to:
perform, based on a microinstruction associated with processing data received by the network device, a first arithmetic logic operation to generate a first result;
output the first result via a particular bus of a plurality of buses;
select, based on the microinstruction, the particular bus from the plurality of buses to determine the first result as corresponding to an input;
perform a second arithmetic logic operation on the input to generate a second result; and
output, based on the microinstruction, the second result, the data being processed by the network device based on the second result.

16. The non-transitory computer-readable medium of claim 15, where the input comprises a first input, the instructions further comprising:

one or more instructions that, when executed by the network device, cause the network device to:
select, based on the microinstruction, a set of input buses from the plurality of buses to determine a second input; and
where the one or more instructions to perform the second operation include:
one or more instructions that, when executed by the network device, cause the network device to:
perform the second operation on the first input and the second input to generate the second result.

17. The non-transitory computer-readable medium of claim 15, where
the data comprises a packet received at a line interface of the network device, and
the packet is processed based on the second result.

18. The non-transitory computer-readable medium of claim 15, where the one or more instructions to output the first result include:
one or more instructions to output the first result and a condition code,
where the condition code indicates that the first result satisfies a condition associated with the first operation.

19. The non-transitory computer-readable medium of claim 18,
where the one or more instructions to output the second result include:
one or more instructions to output the second result based on the condition code.

20. The non-transitory computer-readable medium of claim 15, where the microinstruction includes a very long instruction word (VLIW) instruction.

* * * * *